(12) United States Patent
Sid

(10) Patent No.: US 7,355,523 B2
(45) Date of Patent: Apr. 8, 2008

(54) REMOTE CONTROLLED INTELLIGENT LIGHTING SYSTEM

(76) Inventor: Alberto Sid, 14 Cold Stream La., Upper Saddle River, NJ (US) 07458

( * ) Notice: Subject to any disclaimer, the term of this patent is extended or adjusted under 35 U.S.C. 154(b) by 317 days.

(21) Appl. No.: 10/825,066

(22) Filed: Apr. 15, 2004

(65) Prior Publication Data

US 2005/0231134 A1    Oct. 20, 2005

(51) Int. Cl.
*H04Q 5/22* (2006.01)
(52) U.S. Cl. ............... 340/825.52; 340/825.21; 340/825.2; 340/825.22; 362/236; 362/227; 362/233; 315/316; 315/312
(58) Field of Classification Search ......... 340/825.52, 340/825.21, 825.22, 825.36, 825.72, 825.2; 362/236, 227, 233; 315/316, 312
See application file for complete search history.

(56) References Cited

U.S. PATENT DOCUMENTS

| | | | |
|---|---|---|---|
| 5,724,168 A * | 3/1998 | Oschmann et al. | 398/127 |
| 6,175,201 B1 | 1/2001 | Sid | |
| 6,300,727 B1 | 10/2001 | Bryde | 315/294 |
| 6,369,524 B1 * | 4/2002 | Sid | 315/292 |
| 6,761,470 B2 * | 7/2004 | Sid | 362/233 |
| 6,892,052 B2 * | 5/2005 | Kotola et al. | 455/41.2 |
| 7,098,774 B2 * | 8/2006 | Davenport et al. | 340/331 |
| 2003/0197625 A1 * | 10/2003 | Szuba | 340/825.69 |
| 2004/0266480 A1 * | 12/2004 | Hjelt et al. | 455/558 |

\* cited by examiner

*Primary Examiner*—Tuyet Vo
(74) *Attorney, Agent, or Firm*—Lilling & Lilling PLLC

(57) ABSTRACT

An addressable lighting device and control system uses a user-actuable infrared or radio frequency operated remote control(s) to selectively or collectively generate an electronic address for the addressable lighting device on which the device will respond to all future signals from the remote control corresponding to that electronic address. The addressable lighting device has a programming mode for setting the address and a working mode for receiving control signals on the set address and correspondingly setting the desired intensity level of light. The addressable device may have the address set and changed locally (manually) or remotely using the remote control to switch modes, thereby avoiding the problems, expenses and mistakes associated with using dual in-line package (DIP) switches, binary, hex rotary switches, or thumbwheel switches normally used to set each one of the system's unit's unique address.

18 Claims, 7 Drawing Sheets

|         |                                                     |
|---------|-----------------------------------------------------|
| STX1    | Start of transmission                               |
| ADDRESS | From 1 to any number. If = 0 is global address      |
| ETX     | End of transmission                                 |

|         |                                                |
|---------|------------------------------------------------|
| STX2    | Start of transmission                          |
| COMMAND | (a) save SCENE # value<br>(b) Recall SCENE # value |
| ETX     | End of transmission                            |

```
ADDRESS : 90
LEVEL   : 75 %
```

Fig. 10

```
SCENE   5
RECALLED
```

Fig. 11

```
EDITING SCENE 5
   ADDRESS : 1
   LEVEL   : 100 %
```

Fig. 12

REMOTE CONTROLLED INTELLIGENT LIGHTING SYSTEM

FIELD OF THE INVENTION

The present invention relates generally to the field of control systems for lighting devices and, in particular, to a new and useful electronically addressable lighting device and a user-actuable infrared (IR) or radio frequency (RF) protocol addressing system for programming and recalling different states and power intensity levels of one or more electrical devices in one or more zones for the creation of one or more lighting scenes.

BACKGROUND OF THE INVENTION

In many lighting applications, there is a single light or plurality of lights that needs to be controlled individually (one unit at a time) or in groups (several units "grouped" together) or all the lights simultaneously. Among the installations where there is such a requirement are residential track lighting containing a plurality of individual light heads attached to a powered metal track mounted in ceilings and or walls; ceiling lighting having a plurality of lights such as factory and office illumination; artwork lighting in which a single artwork needs to be illuminated; points of purchase or display of items in retail stores; and, theater lighting applications.

In recent years many different remotely actuated devices for controlling lights, specifically dimmers, have been offered in different versions and configurations. Every one of these devices needs to have a unique identity, or address, so it can be individually or collectively controlled. A drawback to these known lighting devices is that the addresses of the devices must be set manually using dual in-line package (DIP) switches, binary, hex rotary switches, or thumbwheel switches. While any these types of switches are widely used, they are usually expensive, physically big, cumbersome and difficult to set. While DIP switches offer the most economical solution for setting the address of the device, they need to be set in binary base, which requires the person setting the address to know binary math, or to use charts explaining how to set the switches for a certain address. In addition, a (n) number of switches will only allow to set any combination of up to $(2)^n$ different addresses (i.e. 8 switches will only allow the use of up to 256 devices). In order to change the address of a particular device or a group of devices, these switches must be reset in the proper configuration for the new address. When the lighting devices have been mounted on ceilings, high walls, fly roads or any other location many feet above the floor, this can present a problem. When these lighting devices are mounted in recessed locations or fixed spots, this difficulty is increased. The address switches may also be obstructed by other objects as well, such as the mounting bracket for the lighting device, further increasing the difficulty of changing the address of the device.

In addition, while there are many different stand alone dimmers to be used with plug-in lamps, for temporarily or permanently connected lighting devices, none offers a self contained unit, containing both the remotely actuated dimmer and the lighting device.

One known system for addressing light dimmers (U.S. Pat. Nos. 6,175,201 and 6,369,524) relies on a DMX-512 protocol controller to output a plurality of channels in sequence. This is useful for an installation where many lights need to be adjusted, but it is too complicated a device when only a few single units need to be adjusted. There are any number of addressable control devices and a DMX protocol controller coordinates and sets the values of these devices. Generally, the DMX Controllers has 512 channels, and each channel has up to 255 discrete amplitude levels. The amplitude level of each channel is independent of the amplitude levels of the other channels. All 512 channels are continuously broadcast in series and a fixed time period T passes between each broadcast of the $512^{th}$ channel. One or more of the control devices is put into the programmable mode. The DMX Controller is set so that all channels have a zero amplitude, except for the channel which corresponds to the desired address. When the signal is now sent from the DMX Controller, the electronic address in this programming mode will be set to the non-zero channel. Then, the control signal is ended and the control devices are switched back to the operating mode. In this manner the electronic address of each control device can be set and a group may even have the same electronic address.

Bryde (U.S. Pat. No. 6,300,727) remotely controls the state and power level of the electrical device. Mechanical type switches are used to set the address. Therefore, the address cannot be set remotely, which is one of the main points and objects of the herein invention.

Therefore, there is a need for a simple easy to use device and system for quickly and easily setting the parameters of an addressable lighting fixture or group of fixtures. Another need in the industry is for a switchless addressing mechanism, so that the lighting devices can be reprogrammed more easily and efficiently

SUMMARY OF THE INVENTION

It is an object of the present invention to provide an electronically addressable lighting device that can be used with an infrared (IR)/radio frequency (RF) remote control to remotely set preset value of the device, such as the intensity level of the light to any desired level from an "off" state (0% output light) to a full maximum intensity (100% light output).

A further object of the invention is to provide a method for using a user-actuable remote controller to remotely set the address of one or any number of installed lighting devices, to avoid the use of multiple switches on each one of the lighting devices.

Another object of the invention is to provide a method for setting a single or multiple groups of lights to any desired level of light intensity, thus creating, storing and later recalling single or multiple scenes in order to create different illuminating effects.

It is a further object of the invention to provide a method for retrofitting existing track light systems, for professional, commercial or residential lighting systems, in order to provide individual addressing to control, store and recall light intensities for each one of the individual light heads mounted on such track light systems.

A further object of the invention is to provide a method for setting and storing a certain light level on each one of the individually mounted lighting devices, whether mounted on the same light track, in recessed lights or in wall mounted lights. Upon removal of the power to each one of the lighting devices (for example by turning of the light switch powering the device or plurality of devices) and later restoring the power to such device(s), the intensity of each one of these device(s) will return to the latest set level of intensity. For instance, in illuminating artworks in museums or items for sale in retail stores, once the power is turned on to the lighting device, it will return automatically to the latest level of light intensity set in each one of the devices prior to the powering it off.

It is a further object of the invention to provide a method for defining, storing, editing, modifying and latter recalling scenes in a user-actuable IR/RF remote control.

Another object is to provide a switchless addressing mechanism for each lighting device.

Accordingly, the invention has a user-actuable IR/RF remote control unit capable of generating and transmitting (a) a programming mode for setting the address and (b) a working mode for transmitting control signals on the set address and correspondingly setting the desired intensity level of light intensity. The addressable device may have the address set and changed locally (manually) or remotely using the remote control to switch modes.

In prior art devices, the electronic address of addressable light dimmers and devices has been set using a plurality of switches. Thus, once the device is positioned in place, its address may not be easily changed if access to the device is restricted.

According to the invention, the electronic address for each lighting device can be set electronically from the remote controller. Each lighting device (or light dimmer) being controlled by the remote control has an electronic address which is set and is preferably unique to that device, and has an electronic circuitry that can receive infrared or radio frequency signals, and decode and interpret the commands being sent to a specific address. Each device will then decode the address being sent by the remote control. If this address matches its own unique address, the lighting device will then continue decoding the command(s) and execute them, for example, by setting its own light intensity level to the requested level. Thus, all other devices that do not match the address sent by the remote control device will ignore the following commands.

One embodiment of the present invention includes a remote control unit, which generates an infrared or radio frequency encoded signal in a specific format. It includes a digital display (such as a vacuum fluorescent tube, a liquid crystal or a light emitting diode type) to visually communicate with the person operating the system. A microprocessor generates the proper encoded signal and error correction protocol. By means of a keyboard or keypad the user is able to set the address of each one of the lighting devices. This system also allows you to create, store and latter recall scenes; to access individually each one of the addressable lighting devices of the system; and, to globally access all the devices present on the system and set any desired intensity level.

Further, it includes non-volatile memory to store and recall the own device's address, scenes, or groups of lights, or individual lights with its corresponding intensity levels. A scene is a group of lights with each light having a unique address with an associated unique intensity level. This group, or scene, can define only one unique device or a plurality of devices, each having a unique intensity level attached to it. In addition, the remote control unit can program a lighting level to each one of the lighting devices. The latest intensity level sent by the remote control to each unique address is then stored in the lighting device for later recall, such as if the power is interrupted to the device.

It also includes the capability of sending a global signal to simultaneously access all the lighting devices, regardless of their unique address. This feature is useful if the person operating the system desires to turn all the lights on to full intensity—such as in the case of a fire emergency—or turn all the lighting devices off, or to any desired light intensity, without the need of creating a special scene to define this specific global state, and thus eliminating the need of sequentially transmitting the information to each one of the lighting devices. This remote control also includes the capability of detecting and informing the person operating the system of a low battery condition, which may render the remote control unusable.

Another embodiment of the present invention includes the lighting device itself which in fact is a light connected to an intelligent, microprocessor controlled dimmer, all contained in one pluggable unit or in two separate units. It contains a receiver capable of receiving and decoding infrared signals, or radio frequency signals, or a combination of both. A mechanical or electronic or magnetic or light switch sets the unit into "learning" mode, so its unique own address can be remotely programmed. By depressing and holding the switch down for a few seconds, the unit will enter the "learning" or programming mode and wait for a signal from the remote control to set its own unique address. When the user rapidly depresses this switch a number of times (for example 10 times), the unit own address can be locally set (in this example to address 10). Instead of using a mechanical switch, a light-detecting switch can be used. When this light-detecting switch (such as an infrared light detecting diode) detects a single directionally transmitted light pulse of a predetermined length of time, it will enter the learning mode, and then the remote control can remotely program the address of the unit in learning mode. This "pulse" of light should be long enough so the transmission of the digital infrared encoded signal transmitted by the remote control will not accidentally set the unit into learning mode. It should also be very directional, so only one lighting device at a time can be set into programming mode, without setting any adjacent unit into programming, or learning mode. An example for this method can be a laser pointer directed at the desired unit for a few seconds. Once the addressable lighting device is flooded for a few seconds, it will enter into learning mode. Yet another example of a switch for programming can be a reed switch, or hall effect switch (solid state magnetic actuated switch). When a fixed magnet is physically positioned next to the unit, the unit will enter into address learning mode. This method is useful when the lighting device to be programmed is in a difficult area to access. By using an extension pole with a small magnet attached to the end of the pole, the unit can then be set to further learn its address sent by the remote control.

This embodiment further includes a small light emitting diode (LED) of any desired color to indicate the status of the unit, for example as follows:
 (a) Slowly, steadily flashing—the unit is in learning mode waiting for the remote control to instruct its own address, and, once the address is received, the light goes off, indicating that the unit's own address was successfully received and stored.
 (b) Rapidly flashing—the unit is in normal operation mode, and receiving a command instruction that matches its own address—in other words, the unit is being "talked to". The LED will flash only when packets of information are properly sent and received from the remote control.
 (c) Steadily ON all the time—the unit is powered on.

This embodiment includes a microcontroller to decode, interpret and process all the information. It includes a non-volatile memory which stores and retrieves its own address, other needed information (such as minimum intensity level that the unit can be set to), the latest intensity level received by the unit, and scene information as explained below. This level is to be recalled and set once power is eliminated and later restored. The device includes a zero crossing detector to synchronize the dimmer. A power supplies power to the electronics. To control the power delivered to the light, it includes a power stage. A mechanical mount is used to attach to an existing lighting track, or wall, or electrical box, or ceiling, or dropped ceiling. There is also the lamp, whose intensity is to be controlled.

BRIEF DESCRIPTION OF THE DRAWINGS

For the purpose of illustrating the invention, reference is made to the accompanying drawings. It is being understood, however, that this invention is not limited to the precise arrangements and instrumentalities shown.

FIG. 10 is a view of one type of screen of display with the unit in Manual Mode.

FIG. 11 is a view of one type of screen of display with the unit in Scene Mode.

FIG. 12 is a view of one type of screen of display with the unit in Edit Scene Mode.

DESCRIPTION OF THE INVENTION

Figure 1:
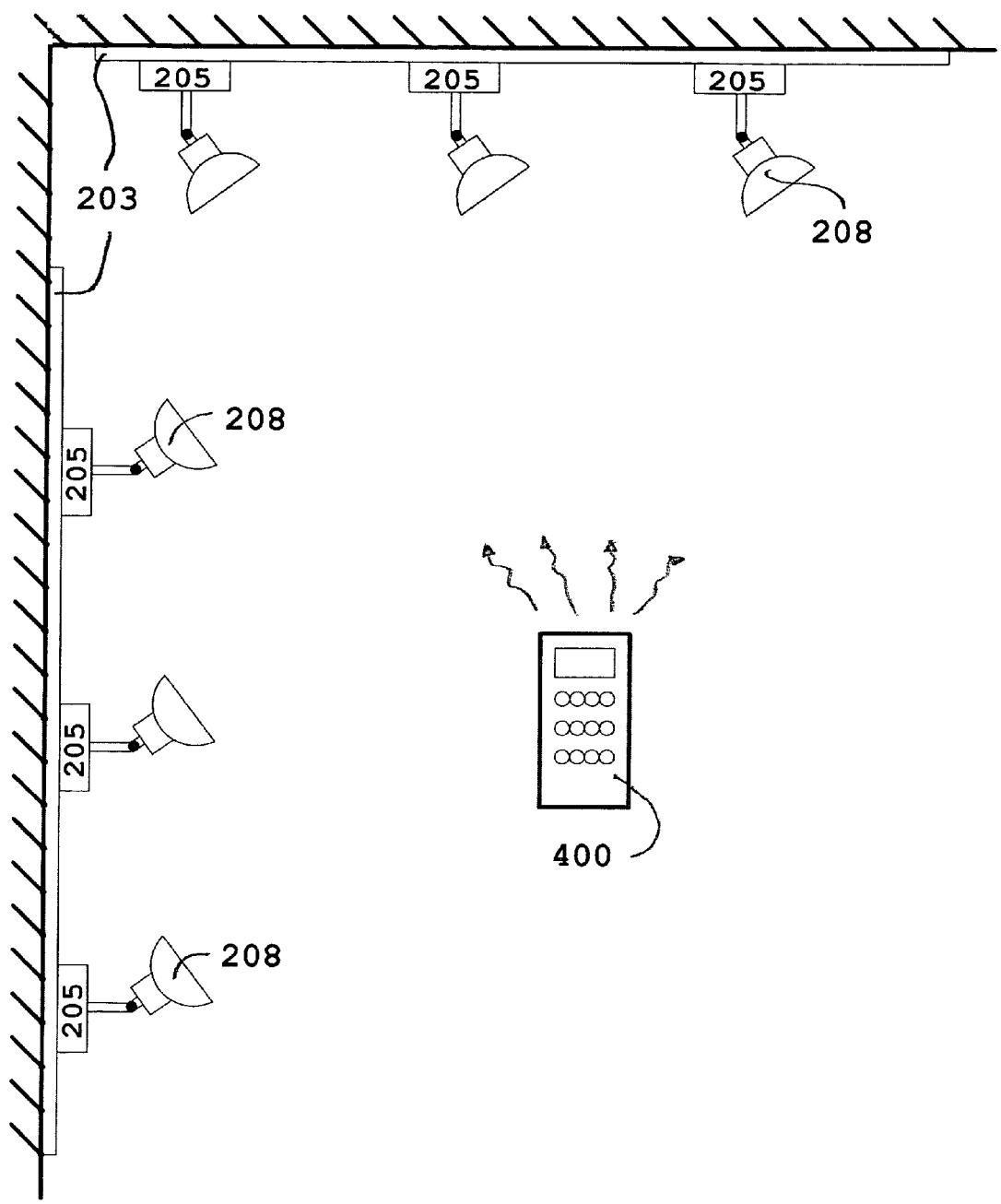
FIG. 1 is a schematic representation of one type of typical layout of a control system of the type used in the invention.
Figure 2:
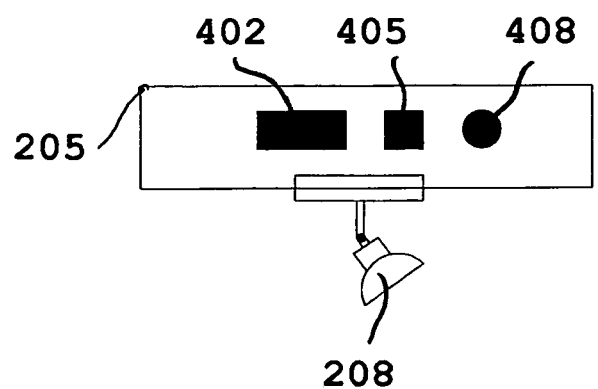
FIG. 2 is a schematic representation of one type of addressable lighting device used with the invention.

As represented in FIG. 1, the layout of a control system, of the type used in the invention, comprises an infrared or radio frequency generating remote control device 400 used to sequentially transmit data to all or any one of the addressable lighting devices 205, each one containing a light source 208 used to illuminate an area. These devices 205 are to be mounted in electrical boxes in walls or ceilings. Another variation is that they can be mounted in existing track lighting systems 203 manufactured by a variety of manufacturers such as Lutron, Lightolier, Leviton, and many others, effectively converting a simple lighting system into a sophisticated, innovative and individually addressable system which can now enable the user to create special effects by adjusting different levels of intensity of each one of the lights in the same lighting track. A particular advantage of this retrofit installation is that existing wiring can effectively be used, avoiding the expense of running special or additional wiring. In such a way, for example, inside the same room different areas of illumination can be created, such as a semi-dark resting area, a bright reading area or any other special effect as desired by a lighting designer. As mentioned, remote control device 400 can generate either an infrared signal (IR), or radio frequency (RF) signal, or a combination of both which will transmit and carry the information to a single or plurality of addressable lighting devices 205. Each one of these devices 205 will then in turn decode and analyze the incoming data generated by remote control 400. If the address of the unit matches the address sent by the remote control 400, the unit 205 will then decode and accept the command of the incoming data, and then set the intensity level of light 208 commanded by the remote control 400. It should be noted that the remote control unit 400 itself is known in the market and has been used in other lighting applications, and is not the subject of this herein patent application. It is identified, solely as being one of the components of the herein new and unique lighting system One type of addressable lighting device 205 used with the invention is shown in FIG. 2. There is an infrared detecting sensor 402. It should be mentioned that this sensor can be a radio frequency antenna instead of an infrared detector, or a combination of both. This sensor 402 detects any incoming signal transmitted in the air and converts it into a digital signal for further analysis by a built in microcontroller as will be explained below in detail. Programming switch or sensor 405 is used to set the unit into programming or learning mode, in which the unit enters into a programming state that enables the remote control to set the device's unique identifying address. In this way, a single electronic switch is used, instead of using a plurality of DIP switches, rotary switches or thumbwheel switches, to set the address of the lighting device. In other words, it is a switchless addressing mechanism in that mechanical switches are not used for setting the address of the lighting device.

Yet another useful characteristic of this method is that there is no limitation on the amount of different addresses that can be assigned to the unit. Large monetary savings and physical real estate are achieved by using this method of address setting. Operator errors are also minimized while setting the device's address. This programming switch 405 can be implemented in several ways. It can be a mechanical switch or pushbutton, easily accessible. By depressing this button for a few seconds, the unit will enter into a learning mode. It is desirable to have to hold the button depressed for a few seconds in order to prevent inadvertently setting the unit into learning mode while physically manipulating the unit, for example while cleaning it, replacing the light bulb 208 or just during orientation of the light source. Yet another implementation of this switch is by using a light-detecting switch, which once illuminated for a few seconds will then instruct the unit to enter into the programming mode. The light source used to actuate this method needs to be very directional in order to avoid adjacent undesired units entering into programming mode. It also needs to be very strong so that the device will not confuse changing ambient light as a command to enter into programming mode. A typical device to actuate this type of light sensitive switch would be a laser pointer.

Another useful type of switch that can be used is a hall effect switch or reed switch. This type of switch mimics the closure of a mechanical switch upon detection of a strong magnetic field, such as the proximity of a small permanent magnet. Advantages of using this type of switch are that the switch can be hidden inside the unit, and only a person knowing its location and also possessing a magnet can reprogram the unit. Yet another advantage is that, if the addressable lighting device 205 is positioned in a difficult place to access, a long pole with a small permanent magnet can be used to reach to the device and set it into programming mode. LED 408 (or any suitable visual indication device of any type) provides visual indication of the status of the unit. A steadily slow flashing rate (of approximately one flash per second), for example, indicates that the addressable lighting device has been set into programming mode, as explained above, and is ready to accept a new address. Once a new address has been sent from the remote control device, and successfully accepted by the receiving device, the LED 408 stops flashing and the new address is saved in non-volatile memory forever, or until a new address is assigned to the device as explained. It is important to emphasize that this address is saved even if the power to the device is removed. Yet another type of indication is when the LED flashes rapidly, indicating that the device is being addressed, and is successfully decoding the incoming signals from the remote control. Only those units being addressed will flash. An exception to this case is when all the units are globally accessed, as will be explained latter. In this case, all the units will flash rapidly. Another indication of the LED is to stay steadily on indicating that the addressable device 205 is powered up and ready to accept commands. Light source 208 can be of any type, incandescent, halogen, fluorescent or solid state type (such as a cluster of LED's).

An example of how to set the address of a certain device to number 123 follows: actuate the programming switch (of any type described above) 405 until LED 408 flashes slowly (at an approximate rate of 1 flash per second). Programming switch 405 can now be released. Set the remote control 400 to "talk" to unit 123, and send any intensity level (i.e. 50%) to the device in program mode. Device 205, since it is in program—or address learning mode—will then decode any incoming signal and interpret the address sent as the self address. Once this address is obtained, it will then be saved in non-volatile memory as the device's own identity.

This programming method described in the invention can be used to set multiple units to the same address. In the last example, if more than one unit were to be set into programming mode, those in programming mode would then assign address 123 to themselves.

Yet another characteristic of device 205 is that it can optionally include an internal timer with a preset timing (for example 20 seconds) that reverts the device from programming mode (if it was in that mode) to normal operating mode if no valid programming address was received and decoded from the remote control within that period of time.

Figure 3:
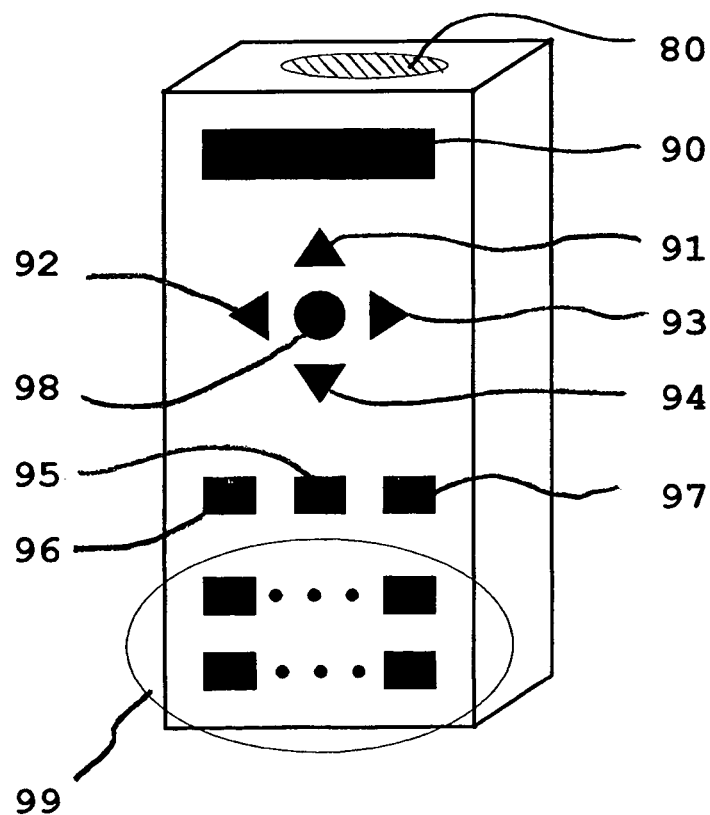
FIG. 3 is a perspective view of one type of user-actuable remote control device used with the invention.

One type of user-actuable remote control device used with the invention is shown in FIG. 3. Infrared or radio frequency transmitting device 80 is positioned in the top of the remote controller (or at some other convenient outer surface location). If the transmitting device is of the infrared type, a direct line of sight to the device needs to be established. Therefore, this is one of the preferred locations for this type of transmitting device. Liquid crystal display (LCD) 90 (or any other type of alphanumeric or numeric display) is used for confirmation of commands entered, and to display any useful information pertaining to the system, such as intensity assigned to each one of the channels, maximum number of channels in the system, low battery indication, etc. Switches 91 to 97 are used to enter information into the remote control and are multifunction. A quick taping of a key will increment/decrement one value at a time. If switch 91 or 94 is held on, the key will increment/decrement respectively and automatically the value (scrolling).

Switch 93 (ADDRESS+) increments the channel number up to the maximum number of channels defined in the system (this number can be programmed in the remote control). For simplicity, we will call this number chMAX. Once the channels is incremented above chMAX, it will automatically wrap back to channel number 1 and so on. Switch 92 (ADDRESS−) decrements the channel number in a similar manner. Once channel 1 is reached, if decremented, the controller will automatically wrap back to chMAX.

Switch 91 (LEVEL+) increases the intensity of light for a given channel (possible values are 0% to 100%). Switch 94 (LEVEL−) decreases the intensity in a similar manner to switch 91 for any given channel (possible values are 100% to 0%).

Switch 95 (MANUAL) switches between MANUAL mode and SCENE mode. In MANUAL mode each channel can be independently accessed, set and recalled as wished. SCENE mode works on clusters of addressable lighting devices. For example, SCENE 5 can have assigned only devices 1, 3 and 5 to light intensities of 12%, 24% and 30% respectively. Once SCENE 5 is recalled, by pressing the corresponding key 5 on the SCENES switch group 99, all those devices with address 1 will go to 12% light intensity, all those with address 3 to 24%, all those with address 5 will go to a light intensity of 30%. The rest of all addressable devices will turn off. This mechanism allows creating any desired illumination effect. It is important to clarify that scenes have been widely used in many lighting and theatrical applications, and it does not pertain to the scope on this invention.

Switch 96 (FAST), when used in combination with switch 91 (LEVEL+), will set the intensity of the desired channel to 100% (full on) without the need of scrolling thorough all the intermediate values. Yet switch 96, when used in combination with switch 94 (LEVEL−) will set the intensity of the desired channel to 0% (off). Switch 97 (GLOBAL) allows to set all the addressable lighting devices 205 to any intensity (as set by switches 91 and 94) regardless of the different unique addresses defined in the system. By using switches 97 (GLOBAL) switch 96 (FAST) and either switches 91 (LEVEL+) or 94 (LEVEL−) all the lighting devices can be simultaneously be turned on (i.e. in an emergency situation) or off respectively and as desired.

There is a cluster of switches 99 to recall and edit scenes, each one corresponding to a different scene. Editing of scenes is beyond the scope of this invention, thus it will not be explained in the invention. Switch 98 (SAVE SCENE) is used in order to store scenes locally in addressable lighting device 250 in a more advance configuration. This more advance configuration of the invention will be explained in detail for FIG. 7.

Figure 4:
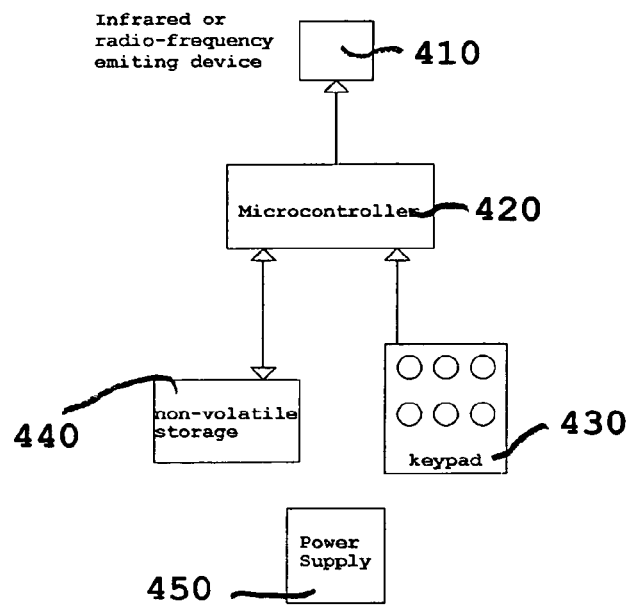
FIG. 4 is a block diagram of the major internal components of one type of remote control device used with the invention.

The major internal components of one type of remote control is shown in FIG. 4 and encompasses infrared or radio frequency emitting device 410. This transmitter transmits the information to all the addressable lighting devices present in the system. Microcontroller 420 is responsible for all the housekeeping, keyboard (or keypad) 430 management (switches 91 to 99), user interface, display 90 management, power supply 450 monitoring and digital encoding of the signals to be transmitted to devices 205 by transmitter 410. Non volatile memory 440 keeps the contents of all manual levels, maximum number of channels defined in the system (chMAX), and scene information. Power supply 450 powers up the whole device.

Figure 5:
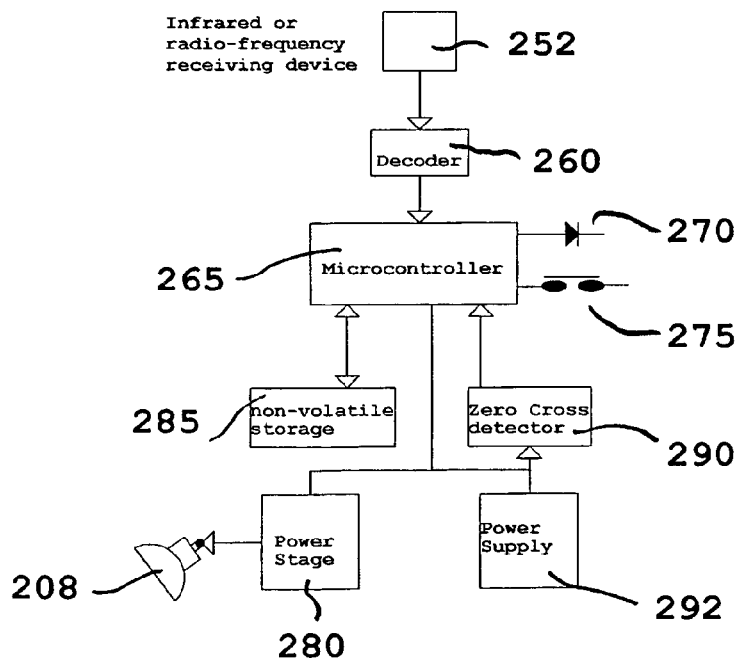
FIG. 5 is a block diagram of the major internal components of one type of addressable lighting device used in the invention.

The major internal components of one type of addressable lighting device is shown in FIG. 5 and encompasses infrared or radio frequency sensing device 252, which receives the encoded signals emitted from remote control's transmitter 80 and passes it to decoder 260 which in turns transforms the incoming IR/RF signals into a digital level. This digital level is then transferred to microcontroller 265, which analyzes the incoming information. If the address matches the address stored in non-volatile memory 285, and the signal arrived without errors, microcontroller 265 then decodes the command issued by remote control 400, gets the desired intensity level and passes it to power stage 280. Power stage 280, which is normally a triac stage, or back to back silicon controlled rectifier (or SCR in short), or reverse firing isolated gate bipolar transistor (or IGBT in short) stage, or any other power or phase modulating stage, then sets the proper intensity of light source 208. Power supply 292 powers all the electronics of the addressable lighting device 250. Zero cross detecting stage 290 synchronizes the zero cross of the sinusoidal power waveform to fire the power stage properly. Many different power stages and zero cross circuitry have been defined, and they are obvious to persons skilled in the electronics art. Power stage 280 can also be a direct current (DC) power stage, in which case zero cross stage 290 will not be needed. If power stage 280 is DC, phase width modulation (PWM in short) could be used to control the intensity delivered to light source 280 as instructed by the remote control. The generation of this PWM can also be implemented by microcontroller 265. Non-volatile memory 285 keeps the address of the device, as well as the last intensity of the device, as set by remote controller 400. For example, if the device was set to operate at 35% light output, upon powering off and on the device, the light output will be set to 35%. This is another advantage of the invention, in which the last intensity used is automatically saved for latter recall. In addition, a look up table (LUT in short) for scenes will be stored here, in non-volatile memory 285, in a more advanced configuration of the invention, which will be explained in detail below. Light emitting diode (LED) 270 is used for visual feedback to the operator, as explained above. Programming switch 275 is used to set the addressable lighting device into programming (or "learning" mode).

Figure 6:
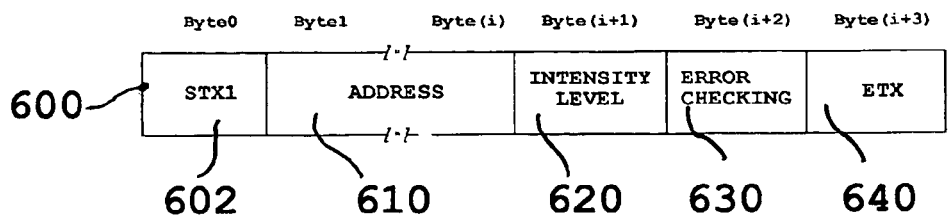
FIG. 6 is a schematic representation of one type of serially transmitted data protocol used with the invention.

FIG. 6 is a description of one type of serially transmitted data protocol used with the invention, and it shows a serially transmitted packet 600 where byte0 602 is STX1 (start of transmission). This byte is used to synchronize all receiving devices 250 and to signal a beginning of transmission; address field 610 comprises the following bytes 1 to (i) where (i) can be any number depending on the user defined (chMAX) maximum number of channels present in the system. The first byte of the address field 610 can assume any number different than zero. A value of zero in this position will signal all the listening devices that the address needs to be ignored. In other words, this is how the invention implements the GLOBAL function. If the value of address field 610 is equal to zero, all devices will then decode the packet 600 regardless of their own identity. It is important to emphasize that address zero, for this reason, cannot be assigned to any addressable device 250; Byte(i+1) is intensity level 620, which corresponds to the intensity to the specific address defined by byte 610, and it can take a value of 0% to 100%. It is important to mention that if a higher than 1% intensity resolution needs to be achieved in the system, the addition of an extra byte in the intensity field 620 will accomplish that, effectively allowing a resolution of (1/65535)% instead of a resolution of (1/255)% achieved with a single byte; error checking byte (i+2) 630 is any mathematical error checking algorithm, such as cyclic redundancy check (CRC) to ensure integrity of the data received. While there are many types of error checking algorithms, this falls outside the scope of the invention; last byte(i+3), ETX (end of transmission) 640 signals the end of the transmission of the packet 600. This field is optional and it can be eliminated, since the arrival of a new STX1, 602 will mean that the previous transmission ended. In this embodiment, if the remote control device 400 is set to operate in MANUAL mode, only one channel at a time will be transmitted. If the control is operated in SCENE mode, all channels will be sequentially transmitted, either in an ascending, descending or randomly grouped channels. Therefore, if the SCENE contains a group or cluster of 50 lights of different addresses, 50 different packets 600 will need to be sent to update the lighting levels of the whole scene. Therefore, there may be a slight visible delay by the time that device 1 is updated to the time that the last device is updated. If time is critical for the update time of the whole scene, a more advance system configuration is described below in detail.

Figure 7:
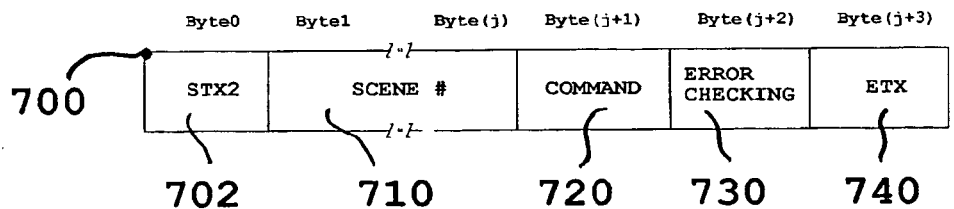
FIG. 7 is a schematic representation of a more advanced type of serially transmitted data protocol used with the invention.

FIG. 7 is a description of a more advanced type of serially transmitted data protocol used with the invention, as defined by packet 700. As explained earlier, in time critical applications (for example where there is a large number of addressable devices in a scene) a local look up table of values (LUT) can be saved internally on each one of the addressable lighting devices 250, in physical non-volatile memory 285. In this case, packet 700 described here is used in addition to the packet 600. Packet 700 has a header STX2 702, with a similar role of STX1, 600. Once this start of transmission STX2 702 is received by all devices 250, they will all simultaneously decode and save SCENE(n) byte1 710 (which can be either 1 to (j) bytes depending on the amount of scenes that want to be used in the system). The following bytes+1), called COMMAND byte 720, will indicate to all devices 250 if the SCENE(n) value 710 needs to be saved or recalled. If the COMMAND field 720 received indicates that SCENE(n) needs to be saved, an entry in the local LUT (located in non-volatile memory 285) in each one of the devices 250 will be saved as follows: SCENE(n) entry will hold the present value of the light intensity in each one of devices 250 for later recall. In contrast, if the COMMAND field 720 received indicates that SCENE(n) needs to be recalled, each one of devices 250 will set independently their intensity according to the value retrieved from their local LUT for the corresponding entry previously assigned to SCENE(n). An example to clarify follows. There are three addressable lighting devices with addresses 10, 20 and 30 set to 15%, 55% and 75% of light intensity respectively. Now a serially transmitted protocol transmitted from the remote control 400 will start with Byte0=STX2. The following byte1=13 (corresponding to SCENE 13). The following Byte2=1 (in this example a value of 1 in the COMMAND field will mean "save"). The following byte Byte (j+2) 730 for error checking and correction, as well as Byte (j+3) 740 (corresponding to ETX) are omitted for clarity of the example. As soon as addressable devices 10, 20 and 30 receive simultaneously the serially transmitted data, addressable device 10 will save a value of 15% intensity for SCENE 13; addressable device 20 will save a value of 55% intensity for SCENE 13; addressable device 30 will save a value of 75% intensity for SCENE 13; and so on, for as many addressable devices 250 are present in the system, in their corresponding internal LUT's. Further to this example, the user will set devices 10, 20 and 30 to an intensity level of 50% each. Now, if the user wants to recall the previously saved SCENE 13, serially transmitted packet 700 transmitted from the remote control 400 will start with Byte0=STX2. The following byte1=13 (corresponding to SCENE 13). The following Byte2=2 (in this example a value of 2 in the COMMAND field will mean "recall"). The following bytes for error checking and correction, as well as Byte (j+3) (corresponding to ETX) are omitted for clarity of the example. As soon as addressable devices 10, 20 and 30 receive simultaneously the serially transmitted data, addressable device with ID=10 will recall the intensity value assigned to SCENE 13, equal to 15% light intensity; addressable device with ID=20 will recall the intensity value assigned to SCENE 13, equal to 55% light intensity; addressable device ID=30 will recall the intensity value assigned to SCENE 13, equal to 75% light intensity. Thus, the complete SCENE 13 is restored to the same lighting intensity as previously saved.

Figure 8:
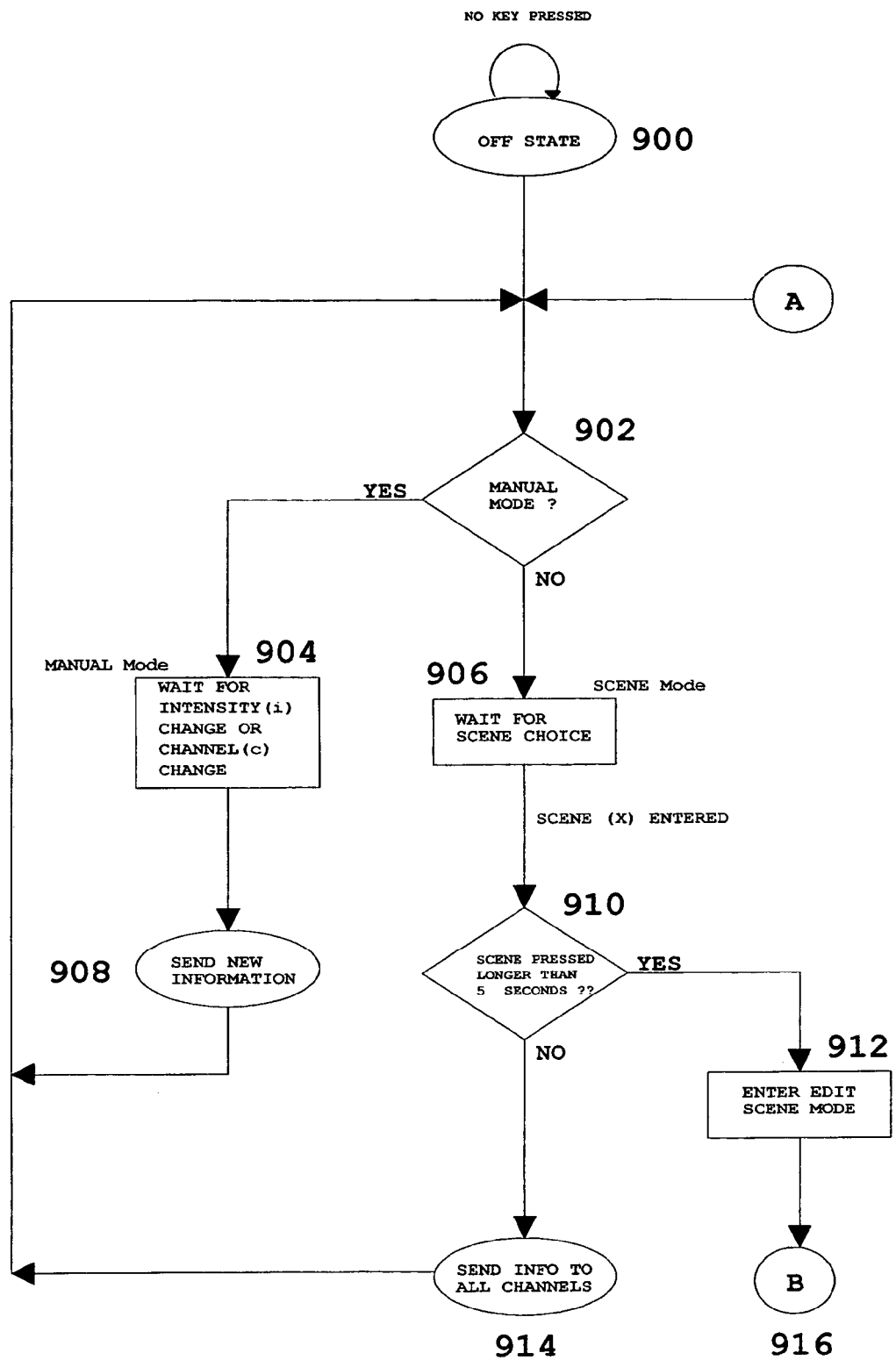
FIG. 8 and FIG. 9 are a flow chart, describing one type of software used to operate the remote control device used with the invention.
Figure 9:
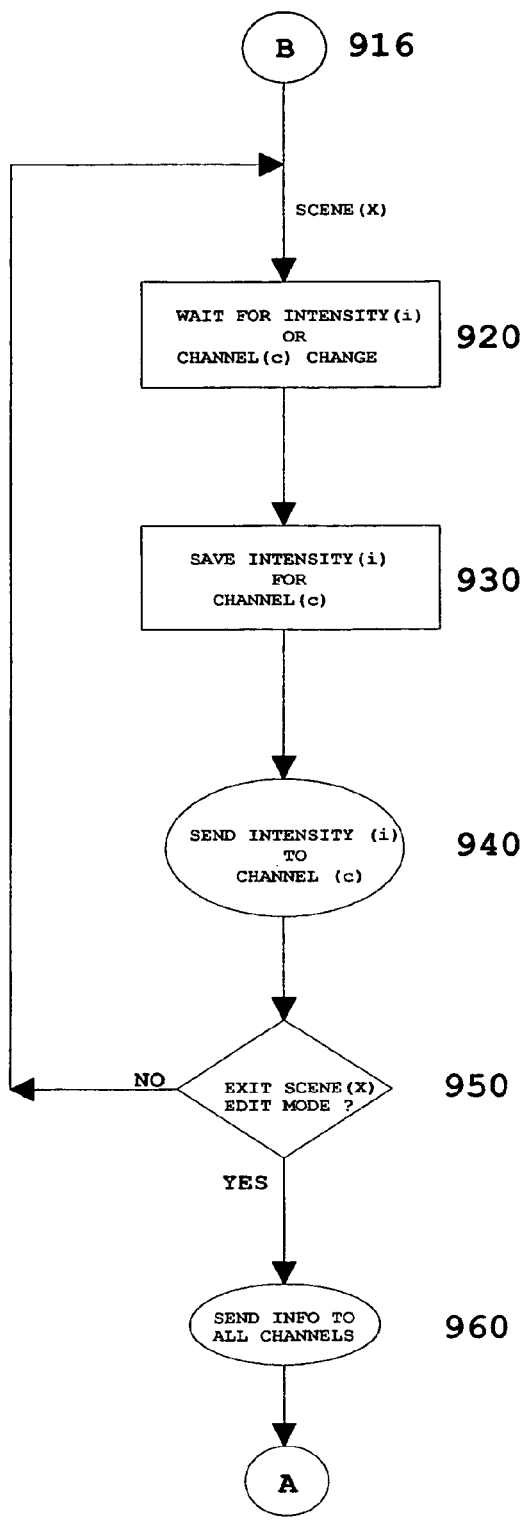

A flow chart describing one type of software used to operate the remote control device 400 used with the invention is shown in FIG. 8 and FIG. 9. Referring to FIG. 8, remote control 400 is in a standby status 900 to preserve battery lifetime. Display and all functions are asleep. Once any key is pressed (in this example, although other variation of remote controls could have an "ON" key to turn it on) the remote control exits the stand by mode and enters the active operational mode (i.e. the display shows the software revision or any relevant and pertinent information for its operation) 902 on which the remote control awaits further operator instruction. At this point, the operator will decide to either enter Manual Mode 904 by depressing the correspondent key 95 or enter Scene Mode 906 by depressing any key on group of keys 99. If Manual Mode 904 is entered, the software waits for operator instruction to change any one intensity (i) corresponding to channel (c) of the plurality of addressable lighting devices 205. By depressing key 91 (LEVEL+) the intensity (i) can be increased and by depressing key 94 (LEVEL−) the intensity (i) level can be decreased. Similarly, channel (c) can be incremented by depressing key 93 (ADDRESS+) or decremented by depressing key 92 (ADDRESS−). Once any of the above keys is released, indicating that a change was detected on the remote control, the software will step to state 908 and send the information to the system through the IR/RF link. Once the information is sent over the air, or broadcasted, the software will loop back to state 902 and stay in Manual Mode unless any key in group 99 is pressed, indicating that Scene Mode 906 is desired to be entered.

If Scene Mode 906 is entered by depressing any key in group 99, Scene (x) is entered. For example, if key number 3 is depressed in group 99, the software will understand the action as if the operator wanted to enter Scene (3). If the key corresponding to Scene (x) in group 99 is depressed for less than 5 seconds (or any other arbitrary length of time that can by easily identified form a longer period of time on which the key is held down) the software interprets this action as a Scene (x) recall, meaning the operator does not wish to enter Edit Scene Mode 912, but just to recall Scene (x) and update all addressable devices 205 in the system to those intensity levels as associated to each one of the channels (c). This is the case for State 914, in which all the information associated to Scene (x) is then sent over the air, or broadcasted as explained above (with either one of both embodiments described herein by FIG. 6 or FIG. 7). Once all the information has been sent over, the software will loop back to State 902. In order to simplify the explanation of the flow chart, it is assumed that the operator still wishes to stay in Scene Mode. (If he wished to enter Manual Mod, he would have pressed key 95). The software then proceeds to State 906.

In contrast, if any key corresponding to Scene (x) in group 99 is depressed for more than 5 seconds (or any other arbitrary length of time that can by easily identified form a shorter period of time on which the key is held down) the software interprets this action as Scene (x) editing, meaning the operator wishes to enter Edit Scene Mode 912. The software in remote control 400 will then enter State 920 (through State 916). The software then waits for operator instruction to change any one intensity (i) corresponding to channel (c) of the plurality of addressable lighting devices 205. By depressing key 91 (LEVEL+) the intensity (i) can be increased and by depressing key 94 (LEVEL−) the intensity (i) level can be decreased; this intensity (i) is associated to channel (c). Similarly, channel (c) can be incremented by depressing key 93 (ADDRESS+) or decremented by depressing key 92 (ADDRESS−). Once any of the above keys is released, indicating that a change was detected on the remote control, the software will step to state 930. In this state an entry corresponding to Scene (x) will be made, for channel (c) with an associated intensity (i) will be saved in non-volatile storage memory 440 for latter recall. Once this entry is saved, the software will then step to State 940 and send the information to the system through the IR/RF link. The information is sent every time a change is detected in order to see in real time how the changes are affecting the overall lighting. Once the information is sent over the air, or broadcasted, the software will then check in State 950 if the operator wishes to exit the Edit Scene Mode 912. If it stays in this mode, the software will now loop back to State 920 and wait for operators' input for further instructions and adjustments to Scene (x) levels of intensity. If Edit Scene Mode is exited (by depressing any key in group 99 for more than 5 seconds (or any other arbitrary length of time that can by easily identified form a shorter period of time on which the key is held down) the software will advance to State 960; State 960 will in turn recall all the information associated to Scene (x) and then send it over the air, or broadcasted as explained above (with either one of both embodiments described herein by FIG. 6 or FIG. 7). Once all the information has been sent over, the software will loop back to State 902. It is also important to mention that at any given state in the described flow chart, the software continuously checks for activity on all the keys. If no key is depressed within a set period of time (i.e. for five minutes) the remote control will step back to State 900 (stand by mode) in order to preserve battery lifetime.

While a specific embodiment of the invention has been shown and described in detail to illustrate the application of the principles of the invention, it will be understood that the invention may be embodied otherwise without departing from such principles and various other modifications can be effected and still be within the spirit and scope of the invention.

I claim:

1. An addressable lighting device and control system comprising:
   a remote control;
   at least one addressable lighting device with an electronic address and having a detecting means for detecting signals from said remote control, and a means for switching said addressable lighting device into a programming mode;
   a microcontroller; and
   a lighting means controlled by said addressable lighting device;
   wherein the improvement comprises: said remote control transmitting said signal as a single channel signal wherein said single channel signal is a serially transmitted data protocol, and further comprising:
   A. a means for synchronizing said lighting devices to signal a beginning of transmission of said serially transmitted data protocol; and B. a means for generating said serially transmitted data protocol with an address field wherein a first byte of the address field being different than zero, and with an intensity level field corresponding to an intensity of a specific address defined by said address field.

2. An addressable lighting device and control system according to claim 1, wherein said detecting means is an infrared sensor or a radio frequency antenna.

3. An addressable lighting device and control system according to claim 1, wherein said means for switching is a non mechanical switch.

4. An addressable lighting device and control system according to claim 1, wherein said remote control means transmits said channel signal as an infrared or radio frequency signal.

5. An addressable lighting device and control system according to claim 1, wherein said remote control means includes a plurality of switches to set parameters of said single channel signal transmitted to said addressable lighting device.

6. An addressable lighting device and control system according to claim 1, wherein said remote control means includes a keypad to set parameters of said single channel signal transmitted to said addressable lighting device.

7. An addressable lighting device and control system according to claim 1, wherein said addressable lighting device further includes a decoder to transform an incoming signal into a digital signal.

8. The addressable lighting device and control system of claim 1, wherein said value in said address field corresponds to a value in a lookup table, said lookup table being contained in a memory in said addressable lighting device and said microcontroller resolves if the value in said address field of said signal pertains to said electronic address of said addressable lighting device and if said address field corresponds to said electronic address then said controllable lighting means is activated in accordance with instructions in said incoming signal.

9. An addressable lighting device and control system according to claim 1, wherein said remote control means transmits a single channel signal to switch said addressable lighting device into programming mode.

10. An addressable lighting device and control system according to claim 9, wherein said means for switching is a non-mechanical switch.

11. An addressable lighting device and control system according to claim 1, further comprising means to activate said means for switching said addressable lighting device into said programming mode.

12. An addressable lighting device and control system according to claim 11, wherein said means to activate said means for switching said addressable lighting device into said programming mode is a non-mechanical device.

13. An addressable lighting device and control system according to claim 11, wherein said means for switching is a non-mechanical switch.

14. An addressable lighting device and control system according to claim 1, wherein said addressable lighting device further includes a visual display means to indicate the status of said addressable lighting device.

15. An addressable lighting device and control system according to claim 14, wherein said visual display means is a light emitting diode display.

16. An addressable lighting device and control system according to claim 1, wherein said remote control means includes a microprocessor to generate said single channel signals.

17. An addressable lighting device and control system according to claim 16, wherein said remote control means includes a plurality of switches to set parameters of said single channel signal transmitted to said addressable lighting device.

18. An addressable lighting device and control system according to claim 16, wherein said remote control means includes a keypad to set parameters of said single channel signal transmitted to said addressable lighting device.

* * * * *